Figure 2:
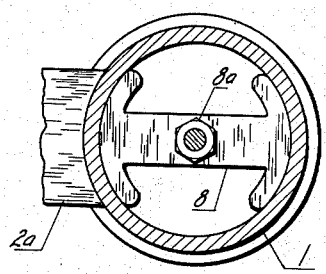

July 2, 1940.                    W. R. POWERS                    2,206,235
                         FLUSH-TANK VALVE CONSTRUCTION
                              Filed Aug. 5, 1939

INVENTOR.
                                              Walter R. Powers
                                        BY    William B. Jaspert
                                                    ATTORNEY.

Patented July 2, 1940

2,206,235

UNITED STATES PATENT OFFICE 2,206,235

FLUSH TANK VALVE CONSTRUCTION

Walter R. Powers, Pittsburgh, Pa.

Application August 5, 1939, Serial No. 288,479

3 Claims. (Cl. 4—57)

This invention relates to new and useful improvements in flushing valves for closet tanks and it is among the objects thereof to provide a flushing valve which shall embody means for positively seating on the flow outlet and prevent the seepage or leakage of water.

A further object of the invention is the provision of a flushing valve which shall be positively guided in its flow passage controlling movements.

Another object of the invention is the provision of means for adapting the invention to the conventional type of flushing tank already installed, without necessitating any cutting or drilling operations.

Figure 1:
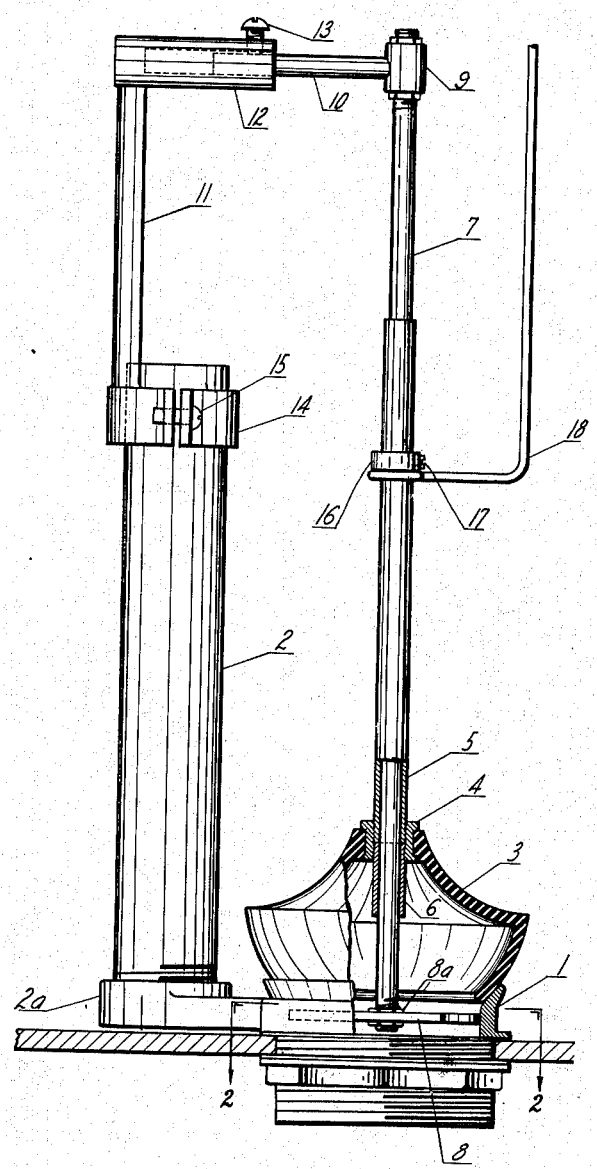

These and other objects of the invention will become more apparent from a consideration of the accompanying drawing constituting a part hereof in which like reference characters designate like parts and in which:

Fig. 1 is a side elevational view partially in cross-section showing a flush valve embodying the principles of this invention;

Fig. 2 a sectional view thereof taken along the line 2—2, Fig. 1.

In the drawing, the numeral 1 designates a valve fitting connected to the base of a flushing tank having a relatively large flow passage that is controlled by a valve 3 consisting of a molded rubber structure of the conventional form, excepting that the bottom thereof is cut away and not sealed, the valve 3 having a threaded sleeve 4 molded in the constricted neck portion thereof.

A long tubular sleeve 5 provided with a threaded end is screwed into the sleeve 4 of the valve, the member 5 being of a non-corroding substance, such as brass or bronze, and a sleeve 6 of aluminum to lighten the weight of the valve is screwed into the bottom end of the sleeve 4, as shown. The aluminum sleeve contained within the valve is not exposed to the water of the tank and will, therefore, not corrode. A guide rod 7 is disposed within sleeves 5 and 6 having a sliding fit therewith to permit the free movement of the valve sleeves 5 and 6 coaxially with the rod 7, without binding on the rod, the bottom of rod 7 being secured to a spider 8 by the nuts 8a, the spider 8 having a press fit with the fitting 1, as shown in Figs. 1 and 2. While the spider 8 may, of itself, be ample support for the rod 7 to permit sliding movement of valve 3 thereon, it is desirable, especially where the valve is to be applied, to flush tanks already installed, to provide a support at the top of the rod 7, which is shown in the drawing, consisting of a threaded lug 9 mounted on the end of a cylindrical arm 10 which is adjustably mounted in a drilled hole 12 of a bracket 11, the set screw 13 being provided to lock the element 9 in its adjusted position.

Bracket 11 is a provided with a clamping bracket 14 secured by a plurality of set screws 15 to the stand pipe 2, which is the conventional overflow pipe that is threaded in an extension or lug 2a of the fitting 1. The clamp 14 permits vertical adjustment of bracket 11, and the screw 13 horizontal adjustment of the support 9, whereby the rod 7 can be accurately aligned with the outflow passage of the fitting 1. The valve sleeve 5 is provided with a ferrule 16 which is secured to sleeve 5 by set screw 17, the ferrule having grooves for receiving the lifting link 18 of the trip lever mechanism by which the valve 3 is actuated. To assemble the flush valve mechanism, it is merely necessary to insert the spider 8 of the guide rod 7 into the fitting 1, then place the assembled valve 3 with its sleeves 5 and 6 on rod 7 with the valve 3 lowered on its seat, as shown in the drawing. The bracket 11 is then mounted on the stand pipe 2 and secured thereto by the clamp 14. The slide bracket 9 is then adjusted to center it with the center of the outflow passage of fitting 1 to secure the guide rod 7 in vertical alignment with the outflow passage, the set screw 13 being turned to lock the bracket in the adjusted position. Valve 3 is then free to slide vertically when actuated by the linkage 18 and when released will be accurately guided to seat on the outlet passage of the fitting 1. The feature of the invention is the provision of a relatively long hollow valve stem which is constituted by the sleeves 5 and 6, so as to provide a large area of contact of the valve stem with the guide rod 7, thereby eliminating binding of the valve on the guide rod and consequent wear on the engaging parts.

By the use of the guide rod and long hollow valve stem, accurate seating of the flush valve 3 on the mouth of the outlet passage is assured, and the leakage of water from the water closet is definitely eliminated. By means of the mounting bracket employed, the improved flush valve can be economically applied to existing flush tank structures.

Although one embodiment of the invention has been herein illustrated and described, it will be evident to those skilled in the art that various modifications may be made in the details of construction without departing from the principles herein set forth.

I claim:

1. A flush valve mechanism comprising an outflow passage, a valve controlling the flow through said passage, said valve having a hollow stem, a bracket for mounting on the overflow pipe adjacent said outflow passage and above the flush valve, a horizontally adjustable bracket on said first-named bracket and a guide rod extending from said adjustable bracket through said valve stem.

2. A flush valve mechanism comprising an outflow passage, a valve controlling the flow through said passage, said valve having a hollow stem, a bracket for mounting on the overflow pipe adjacent said outflow passage and above the flush valve, a horizontally adjustable bracket on said first-named bracket and a guide rod extending from said adjustable bracket through said valve stem, said rod being supported in the outflow passage at its lower end.

3. In a flush valve, a rubber bulb open at the bottom having a threaded fitting molded therein, a tube threaded into said fitting and extending above the bulb, a second tube extending from said fitting into said bulb, said tubes jointly constituting a hollow valve stem, and a guide rod for sliding engagement with said stem in coaxial alignment with said bulb.

WALTER R. POWERS.